United States Patent
Sloan et al.

(10) Patent No.: US 7,103,072 B1
(45) Date of Patent: Sep. 5, 2006

(54) SYSTEM AND METHOD FOR SYNCHRONIZATION OF DEVICES ACROSS A PACKET NETWORK

(75) Inventors: William Sloan, Goleta, CA (US); Mark Rumer, Santa Barbara, CA (US); Marcus Prewarski, Santa Barbara, CA (US)

(73) Assignee: Occam Networks, Goleta, CA (US)

( * ) Notice: Subject to any disclaimer, the term of this patent is extended or adjusted under 35 U.S.C. 154(b) by 36 days.

(21) Appl. No.: 10/326,505

(22) Filed: Dec. 19, 2002

(51) Int. Cl.
*H04J 3/06* (2006.01)
(52) U.S. Cl. ..................................... 370/503; 370/516
(58) Field of Classification Search ................ 370/352, 370/353, 354, 389, 392, 395.21, 395.51, 370/395.52, 503, 506, 507, 395.62, 508, 370/509, 510, 512, 513, 514, 516, 517, 518, 370/519, 520, 398, 351, 395.53, 511; 375/375
See application file for complete search history.

(56) References Cited

U.S. PATENT DOCUMENTS

| | | | | |
|---|---|---|---|---|
| 6,167,048 | A * | 12/2000 | Law et al. ............. | 370/395.62 |
| 6,175,872 | B1 * | 1/2001 | Neumann et al. ........... | 709/231 |
| 6,393,126 | B1 * | 5/2002 | van der Kaay et al. ..... | 380/241 |
| 6,801,951 | B1 * | 10/2004 | Roden, III ................... | 709/248 |
| 6,804,318 | B1 * | 10/2004 | Alloin et al. ................ | 375/373 |
| 6,826,590 | B1 * | 11/2004 | Glanzer et al. ............. | 709/200 |
| 6,952,399 | B1 * | 10/2005 | Bayerl et al. ............... | 370/229 |
| 6,975,655 | B1 * | 12/2005 | Fischer et al. .............. | 370/516 |
| 6,993,101 | B1 * | 1/2006 | Trachewsky et al. ....... | 375/343 |
| 7,000,031 | B1 * | 2/2006 | Fischer et al. .............. | 709/248 |
| 2002/0039370 | A1 * | 4/2002 | Elliot .......................... | 370/503 |
| 2002/0186716 | A1 * | 12/2002 | Eidson ........................ | 370/503 |
| 2003/0177154 | A1 * | 9/2003 | Vrancic ....................... | 708/160 |
| 2003/0228005 | A1 * | 12/2003 | Melick et al. ........... | 379/93.01 |
| 2004/0001516 | A1 * | 1/2004 | Friedrichs et al. .......... | 370/506 |
| 2004/0062278 | A1 * | 4/2004 | Hadzic et al. .............. | 370/503 |
| 2004/0156325 | A1 | 8/2004 | Perkins et al. | |

OTHER PUBLICATIONS

David L. Mills, "Internet Time Synchronization: the Network Time Protocol," IEEE Trans. Communications 39, 10 pp. 1482-1493 (Oct. 1991).

"Part 3: Carrier sense multiple access with collision detection (CSMA/CD) access method and physical layer specifications, Section One: This section includes Clauses 1 through 21 and Annexes A through H," IEEE Std. 802.3-2002, pp. l-vii, 1-552 (Mar. 8, 2002).

(Continued)

*Primary Examiner*—Phirin Sam
(74) *Attorney, Agent, or Firm*—Blakely, Sokoloff, Taylor & Zafman LLP (57) ABSTRACT

A local time of a broadband loop carrier terminal is synchronized to a network time received from a source external to the broadband loop carrier terminal by comparing the local time to the network time to generate an error offset, and adjusting the local time based on the error offset. The network time may be received in response to a Network Time Protocol (NTP) poll transmitted by the broadband loop carrier terminal. In some cases, the poll is transmitted over a communication medium using an asynchronous packet protocol, such as Ethernet or TCP/IP. In one embodiment, the local time is based on the output of a local oscillator (e.g., a voltage controlled oscillator), the frequency of which may be adjusted using control logic which uses a filtered version of the error offset along with a factory calibration and/or temperature compensation to produce a control voltage to control the oscillator frequency.

8 Claims, 5 Drawing Sheets

OTHER PUBLICATIONS

"Part 3: Carrier sense multiple access with collision detection (CSMA/CD) access method and physical layer specifications, Section Two: This section includes Clauses 21 through 33 and Annexes 22A through 32A," IEEE Std. 802.3-2002, pp. 1-582 (Mar. 8, 2002).

"Part 3: Carrier sense multiple access with collision detection (CSMA/CD) access method and physical layer specifications, Section Three: This section includes Clauses 34 through 43 and Annexes 36A through 43C," IEEE Std. 802.3-2002, pp. 1-379 (Mar. 8, 2002).

D. Mills, "Simple Network Time Protocol (SNTP) Version 4 for IPv4, IPv6, and OSI," Network Working Group, Request for Comments: 2030 (Oct. 1996).

David L. Mills, "Network Time Protocol (Version 3) Specification, Implementation and Analysis," Network Working Group, Request for Comments: 1305 (Mar. 1992).

* cited by examiner

SYSTEM AND METHOD FOR SYNCHRONIZATION OF DEVICES ACROSS A PACKET NETWORK

FIELD OF THE INVENTION

The present invention relates to the field of network communications. More specifically, the invention relates to the field of client-server communications and a system and method for synchronizing devices on each end of a packet network.

BACKGROUND

With the proliferation of the Internet and access to various forms of media over the Internet, including music, video, graphics, movies, and the like, there have been attempts to bring high speed access to the Internet to homes and business so that they may take advantage of the offerings provided over the Internet. To provide high speed communications from remote locations to a subscriber's home, various offerings are available, including cable television, cable modems, digital subscriber lines (DSL), integrated services digital network (ISDN) lines, as well as satellite offerings. These offerings are generally offered in addition to a regular voice communication telephone line and require hardware, cabling, software, etc. in addition to regular telephone communication equipment.

With the digitalization of the telephone system, the Plesiochronous Digital Hierarchy (PDH) protocol has proliferated on the lines that connect a Telco switch to digital loop carrier equipment located in Junctor Wire Distribution Cabinets (JWICs). The telephone system is a synchronous system in which the time on the physical lines is generally uniform, ensuring that communications are sent and received at the same rate, with no fluctuation in the rate. In contrast, the Internet exists on Ethernet networks running the transmission control protocol/internet protocol (TCP/IP). TCP/IP running over Ethernet is a packet based communications system for which timing information is neither communicated nor important. As such, it has proven difficult to efficiently and effectively pass telephone communications traffic between asynchronous communications lines and synchronous or plesiochronous communications lines.

One prior solution for merging asynchronous and synchronous communications is to use two lines in which asynchronous packetized traffic is sent over an Ethernet line and non-packetized communications are transported in parallel over a synchronous or plesiochronous network. This requires installation and maintenance of two network infrastructures. Such duplicating of networks results in increased costs, increased need for hardware, and increased need for space.

In an effort to increase the availability of a single communications line to homes and businesses that handles telephonic voice, data, television, movies, music, facsimile, and other communications streams, the asynchronous Ethernet protocol has been suggested as a solution. However, in prior systems, time information from an upstream synchronous or plesiochronous network is not communicated across an asynchronous network such as Ethernet, requiring large buffers of memory to somewhat hide the frequency differences between the clock at the sending end and the clock at the receiving end of the communication. Using these buffers requires extra memory in an amount that is directly related to the frequency difference between the two clocks over the period of communication. Increased memory requirements results in increased cost for the devices used in the communications system. Using these buffers creates a need for additional processing and adds delay to the communications over the asynchronous network, reducing the quality of service and causing distortions, drop outs and failures. As such, the large buffer solution is inadequate because it cannot deliver a required quality of service of delivery of the communications. Lastly, if the period of communication is continuous, the buffers will either overrun or underrun, causing a lapse in communication.

SUMMARY OF THE INVENTION

A local time of a broadband loop carrier terminal is synchronized to a network time received from a source external to the broadband loop carrier terminal by comparing the local time to the network time to generate an error offset, and adjusting the local time based on the error offset. The network time may be received in response to a Network Time Protocol (NTP) poll transmitted by the broadband loop carrier terminal. In some cases, the poll is transmitted over a communication medium using an asynchronous packet protocol, such as Ethernet or TCP/IP. In one embodiment, a tracking filter is applied to the error offset such that the local time adjustment is based on an output of the tracking filter. The tracking filter may include a fast converging frequency tracking filter and a slow converging phase tracking filter. Further, a jitter filter may be applied to the error offset such that the jitter filter provides the input to the tracking filter. The local time is based on the output of a local oscillator (e.g., a voltage controlled oscillator), the frequency of which may be adjusted using control logic. The error offset, along with a factory calibration and/or temperature compensation are used by the control logic to produce a control voltage to control the oscillator frequency.

In a further embodiment, a clock signal is retrieved from a remote source over a network (e.g., a PDH network) and a local time is set based on the clock signal. In response to a request from a client, the local time is sent to the client. Such receiving and sending may be done using NTP and/or using an asynchronous packet protocol such as Ethernet or TCP/IP. Setting the local time may involve adapting the clock signal from the remote source to a local clock rate.

In a further embodiment, a system includes a processor, an oscillator and a storage device coupled to the processor via a bus and having instructions stored therein which, when executed by the processor, cause the processor to issue requests, via a network interface of the system, for a network time from a device remote to the system and, based on the network time, to adapt a local time based on an output of the oscillator in accordance with the network time. The network interface may be configured to communicate via an asynchronous packet protocol such as Ethernet or TCP/IP. Further instructions, which when executed by the processor, may e included to cause the processor to produce a filtered error offset signal that is used to control the frequency of the oscillator.

Still another embodiment provides a system that includes a source of a network time; a central office terminal coupled to receive the network time over a first communication medium (e.g., a fiber optic cable or a T1 line) via a plesiochronous communication protocol (e.g., PDH); and a remote terminal coupled to receive the network time from the central office terminal over a second communication medium (e.g., a fiber optic cable or a twisted pair) via an asynchronous packet based protocol (e.g., Ethernet or TCP/IP), and to adjust a local time according to a difference between the local time and the network time. The asynchronous packet based protocol comprises one of Ethernet protocol or TCP/IP. Digital communication equipment housed in a Junctor Wire Interface Cabinet may be coupled to the remote terminal over a third communication medium and via the plesiochronous communication protocol. The remote terminal is configured to adjust the local time using a filtered error offset between the local time and the network time.

BRIEF DESCRIPTION OF THE DRAWINGS

The present invention is illustrated by way of example, and not limitation, in the figures of the accompanying drawings in which.

DETAILED DESCRIPTION

The systems and methods described herein provide for using a single network for different types of communications, including data, voice, music, film, television, facsimile, and others. Clock information is received from a remote upstream source, maintained at a server central office terminal, and is sent to a client remote terminal which adjusts and maintains its local time in synchronization with the remote clock information to allow for a constant rate of communications across the asynchronous portions of a larger network that may include synchronous and plesiochronous components.

The systems and methods described herein allow for the distribution of clock information across an asynchronous network such as a packet network and allow for the recovery of the clocking information downstream of the source of the clock information. By using the recovered clock information, the frequency of a controllable oscillator may be changed to match the frequency of an upstream clock information source on another side of the asynchronous network. Highly accurate timestamps are used to distribute the time information across the asynchronous network. A remote terminal or other downstream device may compare a locally generated time with a network time received from a remote source and make adjustments to the local clock as needed.

The systems and methods described herein further include comparing the local time and the network time, and using the difference there between to change the frequency of the locally generated clock so that it is synchronized with the network time. Thus the systems and methods described herein may be used to maintain the synchronization between central office terminals and remote terminals across asynchronous networks such as Ethernet networks and/or TCP/IP networks.

In one embodiment, the systems and methods described herein use the Network Time Protocol (NTP) to control the time on local and remote broadband loop devices. The NTP architecture, protocol and algorithm models are described in Mills, D. L. *Internet Time Synchronization: The Network Time Protocol, IEEE Trans. Communications*, COM-39, 10, pp. 1482–1493, October 1991, incorporated herein by reference. More specifically, the client uses the frequency of an internal clock to generate a local time and synchronize it with the time broadcast from a remote device. Both the local and remote device use NTP. According to the systems and methods described herein, delay sensitive traffic may be transported across an asynchronous network without the need of a separate, duplicative network infrastructure and without excessively large packet buffers.

Figure 1:
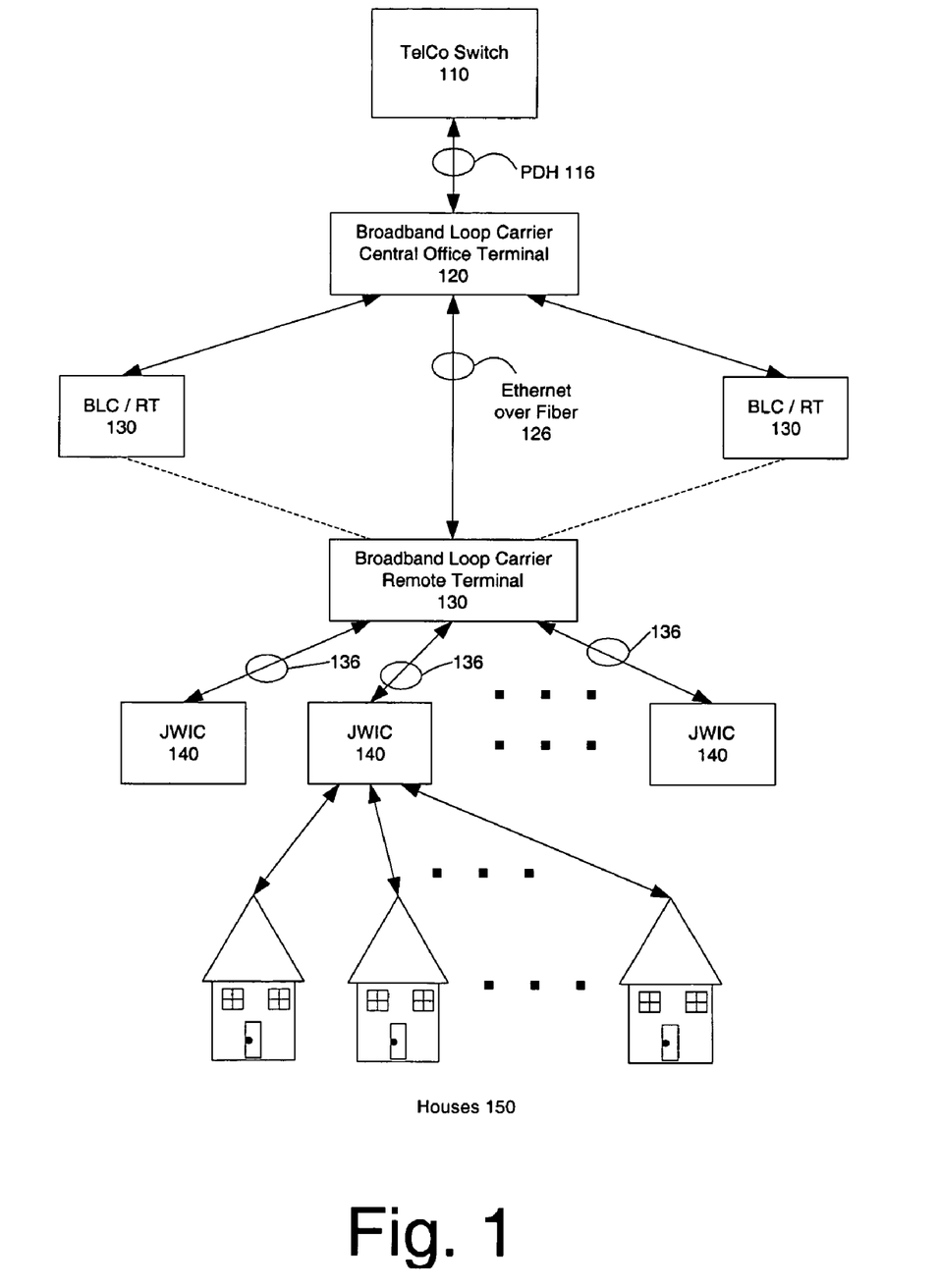
FIG. 1 illustrates a network architecture in which an embodiment of the invention may be implemented.

FIG. 1 illustrates a network architecture in which an embodiment of the invention may be implemented. A Telco switch 110 communicates clock and data according to the Plesiochronous Digital Hierarchy (PDH) protocol over a communications medium 116, such as a T1 line, to a broadband loop carrier at a central office terminal (BLC/COT) 120. BLC/COT 120 receives a network time in the form of a remote clock signal from Telco switch 110, among other kinds of data and communications. According to the methods described herein, the BLC/COT 120 may communicate the network time to broadband loop carrier/remote terminal(s) (BLC/RT) 130 over a fiber optic cable 126 via an asynchronous packet protocol such as the Ethernet protocol or TCP/IP. The Ethernet protocol is defined and described in standards document 802.3 published by the Institute for Electrical and Electronic Engineers (IEEE), entitled "Part 3: Carrier sense multiple access with collision detection (CSMA/CD) access method and physical layer specifications" (IEEE-Std. 802.3), incorporated herein by reference.

This communication path may be used to broadcast data and other kinds of communications that can be transmitted as packets of data (including voice, movies, television, facsimile, etc.) at any well known (or proprietary) speeds, including, for example, 1.544 Mbps., 10 Mbps., and 100 Mbps., as well as Gigabit Ethernet and faster. In various embodiments, the communication medium may be twisted pair or fiber optic media and the Ethernet protocol used may be one or more of 10 Base T, 100 Base T, 10 Base F, 100 Base FX, 1000 Base LX, etc.

The network time received by the remote terminal 130 from the central office terminal 120 may be forwarded to communications equipment housed in a Junctor Wire Interface Cabinet (JWIC) 140 over a communication medium 136, such as a fiber optic cable or twisted pair copper wire, using the PDH protocol. Using this timing information, various data may be communicated, transmitted and otherwise exchanged between end points such as houses 150 and remote entities (not shown) on the other side of Telco switch 110.

Figure 2:
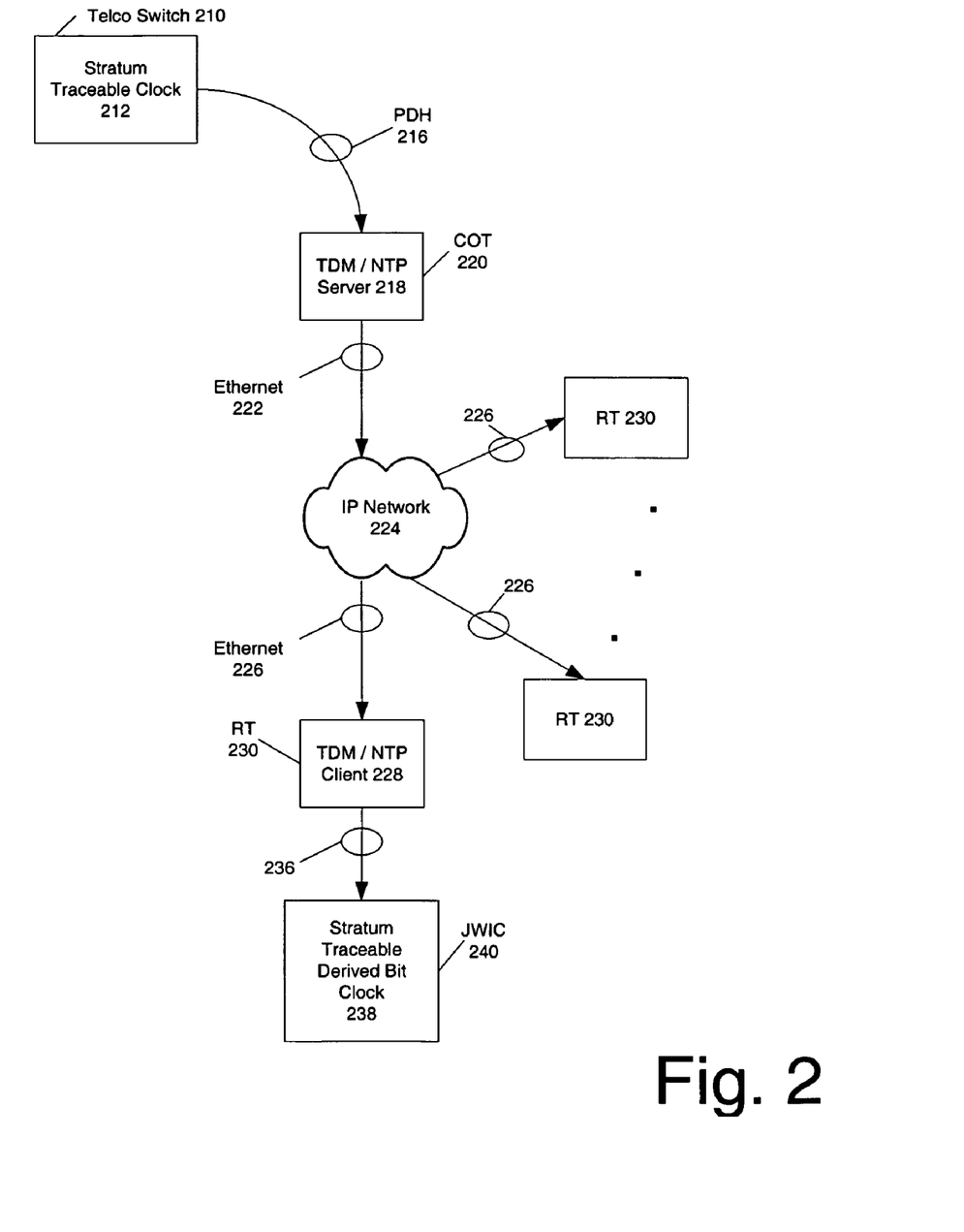
FIG. 2 is a further view of a network configured according to an embodiment of the present invention.

FIG. 2 further illustrates aspects of the present invention. In one embodiment, Telco switch 210 maintains a network time in the form of a stratum traceable clock signal 212, which it communicates over a communication medium such as a fiber optic cable 216 via the PDH protocol to COT 220. COT 220 includes a Time Division Multiplexor (TDM)/NTP server 218. COT 220 sends the network time via Internet Protocol (IP) network 224 to a TDM/NTP client 228 incorporated as remote terminal 230. More specifically, COT 220 receives an NTP request for the network time from remote terminal 230 and prepares a response which is sent in the form of an NTP packet over a communication line 222 using Ethernet and via IP network 224, which is further connected to the remote terminal 230 via another communication line 226 through Ethernet.

The remote terminal 230 processes the network time and corrects its local clock according to the methods described herein. The remote terminal 220 may then communicate, according to the network time via stratum traceable derived bit clock 238, with a JWIC 240 through a communication medium such as a copper wire 236 using the PDH protocol or other synchronous or nearly synchronous protocol. In this way, homes, businesses, or other end points connected to the overall network remain synchronized to the TelCo switch (and upstream nodes) via the time division multiplexors in the broadband loop carriers that include the central office terminal 220 and the remote terminal 230. As such, data may flow at a uniform rate throughout the entire network, including any portions of the network that communicate over an asynchronous Ethernet medium.

Figure 3:
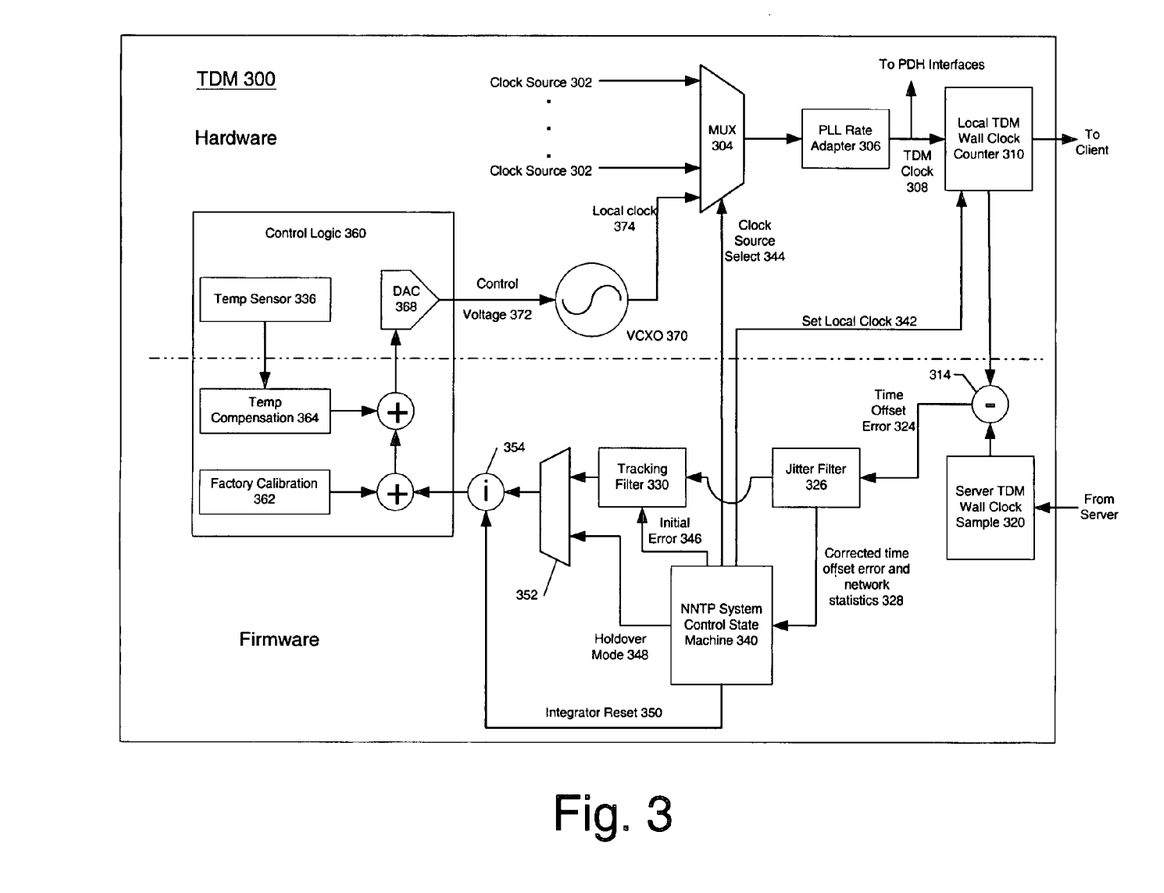
FIG. 3 is a schematic diagram of a time division multiplexor that implements an embodiment of the invention described herein.

FIG. 3 illustrates a schematic diagram of the software (firmware) and hardware components of a device that implements an embodiment of the invention described herein. In one embodiment, a broadband loop may be implemented as a central office terminal and a remote terminal, both of which are time division multiplexors (TDMs) 300 that communicate with one another over a communications medium using an asynchronous communications protocol such as Ethernet. TDM 300 may be used as both server and a client, depending on the software, firmware or other configuration settable component(s).

In one embodiment, when TDM 300 acts as a server, the network time in the form of a clock signal may be retrieved from a remote clock source 302 and provided as an input into a multiplexor 304. The remote clock signal may originate from a highly accurate building integrated timing system (BITS) or other source. Multiplexor 304 is used so that various clock sources may be retrieved. A clock source select signal 344 may be used to determine which clock source is used.

After the clock signal is received and passed through mux 304, the rate of the clock signal may be adapted using a phase lock loop (PLL) rate adapter 306. In one embodiment, the clock source communicates the clock signal at 1.544 Mbps. via a T1 line such that the frame rate of the clock source input is 8 kHz per second. In this embodiment, PLL rate adapter 306 adapts the incoming signal to a rate of 1.024 MHz. The output of PLL rate adapter 306 is the TDM clock signal 308.

A local TDM wall clock counter 310 receives the TDM clock signal 308, and sets the local time to correspond to the adapted clock signal. The local TDM wall clock counter increments at a constant rate of, in one embodiment, 1/1.024 Mhz., or approximately 0.98 μsec. This rate is only an example, and any submicrosecond rate (that is, any rate less than one microsecond) may be used to maintain the accuracy desired of the system described herein.

When the TDM 300 serves as a client or remote terminal, the clock source is a local voltage controlled oscillator (VCXO) 370 which provides local clock signal 374 to mux 304. The PLL rate adapter 306 then adapts the local clock signal to be TDM clock signal 308. The local TDM wall clock counter is adjusted according to the adapted local clock signal that is input to the local TDM wall clock counter 310. The clock signal from the TDM 300 may be distributed to other devices in the network via the PDH protocol. The adapted local clock signal is compared on a periodic basis with a network time in the form of a clock signal obtained from a server TDM device serving as a central office terminal. That is, a server TDM wall clock sample 320 is received from a remote server and compared with a local TDM wall clock signal to arrive at time offset error 324. This simple comparison may be made by a difference circuit such as difference circuit 314.

The time offset error 324 is then provided as an input to jitter filter 326. The output of the jitter filter is a corrected time offset error 328. The corrected time offset error 328 is received as input by tracking filter 330, and by NTP system control state machine 340. The tracking filter 330 adjusts the corrected time offset based on whether the offset error is positive or negative. The resulting filtered offset error is sent as input to mux 352 along with a signal 348 from the NTP system control state machine 340 that specifies a holdover mode. In one embodiment, the tracking filter 330 includes a fast converging frequency tracking filter and a slow converging phase tracking filter.

The NTP system control state machine is a version of the standard NTP state machine commonly used in implementations of the NTP. In addition to the holdover mode signal 348, the NTP system control state machine 340 provides an integrator reset value 350 to integrator 354, which maintains an accumulation of filtered offset values (provided via the output of mux 352) to be presented to the summing nodes of control logic 360.

Control logic 360 provides control voltage 372 to local VCXO 370. More specifically, control logic 360 may include a temperature sensor 366 that drives temperature compensation table 364. Control logic 360 may also include factory calibration table 362. The value from integrator 354 is combined (via the summing nodes of the control logic) with an appropriate value from factory calibration table 362 and temperature compensation table 364, and this combined value is provided as input to digital to analog converter (DAC) 368. In one embodiment, DAC 368 may have a resolution of 10 bits so that the PDH interface may be controlled within 0.25 parts per million. A higher resolution may also be used, as well as lower resolutions, so long as the granularity of the DAC is sufficient to control the VCXO 370 and keep the wall clock counter within a desired range of tolerance. In one embodiment, control logic 360 and VCXO 370 may be combined as a single component.

Figure 4:
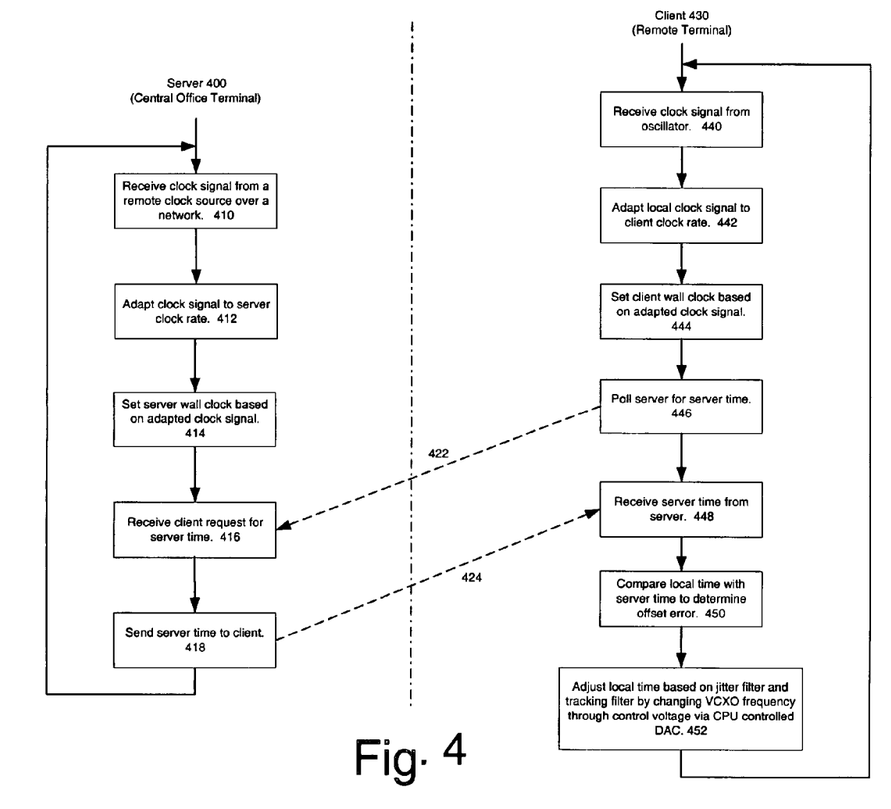
FIG. 4 is a flow diagram illustrating actions taken according to an embodiment of the invention described herein.

FIG. 4 is a flow diagram illustrating actions taken according to an embodiment of the invention described herein. According to the present methods, a TDM at a central office terminal acts as server 400, and a TDM at a remote terminal acts as client 430. The server receives a clock signal from a remote clock source over a network, as shown in block 410. The server adapts the clock signal to the server's clock rate, as shown in block 412. The server increments the server's wall clock based on an adapted clock signal, as shown in block 414. The server may receive a client request for the server's time, as shown in block 416. This request may be formatted according to the NTP. The server processes this request and sends the server's clock time to the requesting client, as shown in block 418. The server's clock time may be formatted and sent according to the NTP. This process repeats as shown.

When the TDM functions as a remote terminal client, the client receives a local clock signal from a local oscillator, as shown in block 440. The client adapts the local clock signal to a client clock rate, as shown in block 442. This adapting is achieved according to the systems and methods described herein. The client increments its local wall clock based on the adapted clock signal, as shown in block 444. The client polls the server for the server's time, as shown in block 446. This polling may be achieved by the running of a UNIX-like daemon according to techniques known to those skilled in the art. The polling may occur on a regular basis, such as, for example, every second, every 16 seconds, etc. The polling request may be sent according to the NTP as request for time 422. A client receives the server time from the server, as shown in block 448. The server time may be sent according to the NTP as server time packet 424. The client compares the local time with the server time to determine an offset error, as shown in block 450. The client then adjusts the local time based a filtered offset error, as shown in block 452. More specifically, the filtered offset error is used to control an oscillator which adjusts a local clock counter. The filtering may be performed using a jitter filter and tracking filters implemented according to the systems and methods described herein. This process repeats as shown.

Figure 5:
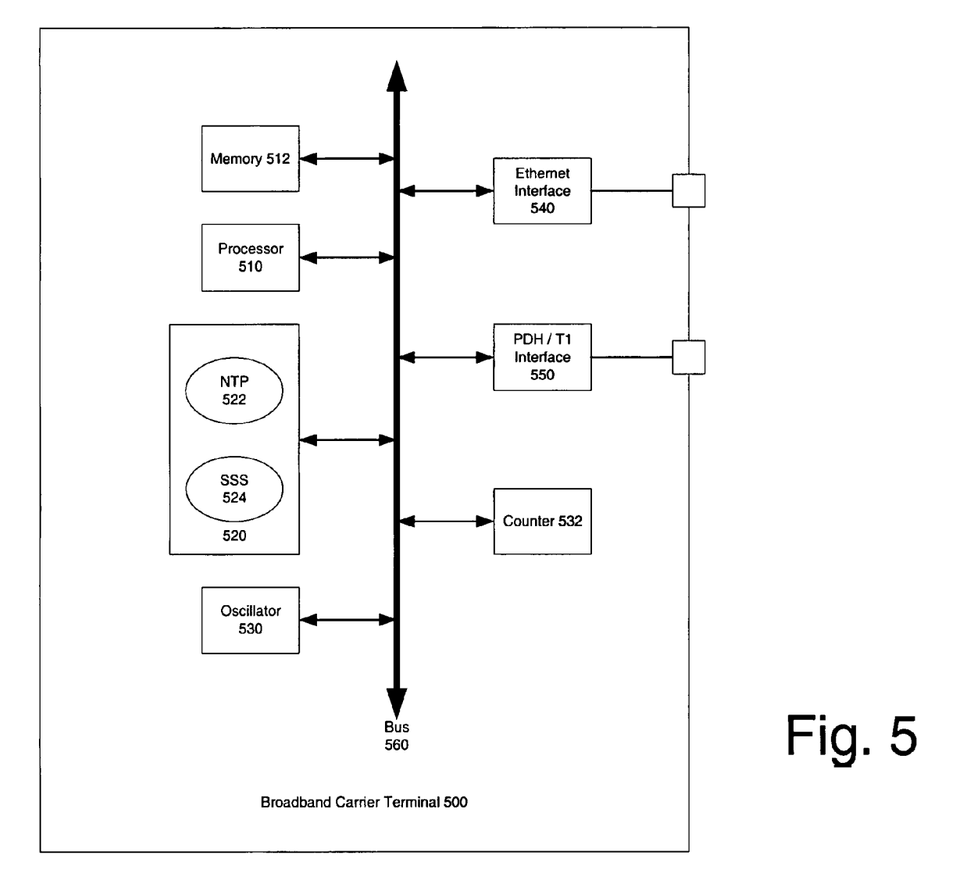
FIG. 5 illustrates an embodiment of a hybrid asynchronous/time division multiplexor capable of serving as a broadband loop carrier terminal in accordance with an embodiment of the present invention.

FIG. 5 illustrates components of a hardware device 500 configured, in accordance with the present invention, as a hybrid asynchronous/TDM that serves as a broadband loop carrier terminal. Such a TDM may be included on both ends of a broadband loop carrier system. The TDM is a broadband loop carrier terminal that, on one end, acts as a server at a central office, and, on the other end, acts as a remote terminal as described herein. In one embodiment, processor 510 and memory 512 are each coupled to bus 560. The processor may be any well known or proprietary microprocessor, such as, for example, an Intel x86 processor, a Motorola Power PC processor, etc. The memory may be any dynamic random access memory. In one embodiment, the memory is 64 MB, but this is only an example, and the amount of memory may be larger or smaller according to various embodiments of the system and methods described herein.

Also included in the broadband loop carrier terminal 500 are Ethernet interface 540 and a PDH/T1 interface 550, each of which is coupled to bus 560. It is through Ethernet interface 540 and PDH/T1 interface 550 that the broadband loop carrier terminal 500 acts as a gateway between other devices over various communications mediums. In addition, although not depicted, other communication interfaces may also be included in the broadband loop carrier terminal. These other communication interfaces may support communications according to SONET, SDH, ISDN, FDDI, FFPT, ATM and other protocols.

In one embodiment, the broadband loop carrier terminal 500 includes a machine readable medium 520 in the form of a storage device such as, for example, a flash memory device. It is on this machine readable medium that NTP software 522 and synchronization system software (SSS) 524, that is, the software that implements the systems and methods described herein, may be stored. In addition, a local operating system such as a version of a UNIX-like operating system, communications software that supports various communication protocols, including, for example, Ethernet, TCP, UDP, IP, ATM and others, and other software may be stored on machine readable medium 520. In other embodiments, other machine readable media may be included in addition to and/or in place of the flash memory device, such as, for example, magnetic disk drives (e.g., hard disk drives), optical media devices (e.g., compact disk devices and digital versatile disk devices), read only memory (ROM), stick memory devices, electronically erasable programmable read only memory (EEPROM), and other silicon devices. In various embodiments, one or more machine readable media may be coupled locally, such as machine readable medium 520, or may be accessible via electrical, optical, wireless, acoustic, and other means from a remote and/or local source, including via a network. Machine readable medium 520 is coupled to bus 560.

In addition, in accordance with the teachings described herein, oscillator 530, counter 532 and various logic (not shown) are coupled to bus 560. Other components and additional instances of the components already described may be included in hardware device 500. These other components and other instances of described components are not depicted in FIG. 5 so as to not obscure the teachings of the systems and methods described herein.

In the foregoing specification, the invention has been described with reference to specific embodiments. It will, however, be evident that various modifications and changes can be made without departing from the broader spirit and scope of the invention as set forth in the appended claims. The specification and drawings are, accordingly, to be regarded in an illustrative rather than a restrictive sense.

What is claimed is:

1. A method, comprising synchronizing, at a broadband loop carrier terminal, a time local to the broadband loop carrier terminal to a network time received from a source external to the broadband loop carrier terminal by comparing the local time to the network time to generate an error offset, by applying a tracking filter to the error offset, wherein the tracking filter includes a fast converging frequency tracking filter and a slow converging phase tracking filter, and by adjusting the local time based on an output of the tracking filter.

2. A method, comprising synchronizing at a broadband loop carrier terminal, a time local to the broadband loop carrier terminal to a network time received from a source external to the broadband loop carrier terminal by comparing the local time to the network time to generate an error offset, by applying a jitter filter to the error offset, and by adjusting the local time based on an output of the jitter filter.

3. The method of claim 2, further comprising applying a tracking filter to the output of the jitter filter such that the adjusting is based on an output of the tracking filter.

4. A method, comprising synchronizing, at a broadband loop carrier terminal, a time local to the broadband loop carrier terminal to a network time received from a source external to the broadband loop carrier terminal by comparing the local time to the network time to generate an error offset, and adjusting the local time based on the error offset and at least a factory calibration and a temperature compensation.

5. A system comprising:
a source of network time;
a central office terminal coupled to receive the network time over a first communication medium via a plesiochronous communication protocol;
a remote terminal coupled to receive the network time from the central office terminal over a second communication medium via an asynchronous packet based protocol, and comprising a phase lock loop rate adapter to adjust a local time according to a difference between the local time and the network time, wherein the remote terminal is configured to adjust the local time using a filtered error offset between the local time and the network time, wherein the filtered error offset is produced using a jitter filter configured and a tracking filter, the jitter filter configured to receive a time offset error signal representing a difference between the network time and the local time, and to produce an output signal to the tracking filter.

6. The system of claim 5, wherein the tracking filter is configured to provide the filtered error offset based on the time offset error signal produced by the jitter filter.

7. The system of claim 6, wherein the remote terminal further comprises control logic configured to utilize the filtered error offset in controlling a frequency of a local oscillator used to produce the local time.

8. The system of claim 7, wherein the control logic is further configured to utilize temperature compensation in controlling a frequency of the local oscillator.

* * * * *